United States Patent [19]

Margen

[11] Patent Number: 4,483,318
[45] Date of Patent: Nov. 20, 1984

[54] BOREHOLE RESERVOIR

[75] Inventor: Peter Margen, Nyköping, Sweden

[73] Assignee: Sonstore KB, Nykoping, Sweden

[21] Appl. No.: 493,549

[22] Filed: May 11, 1983

[30] Foreign Application Priority Data

May 18, 1982 [SE] Sweden .............................. 8203112

[51] Int. Cl.³ .............................................. F24J 3/02
[52] U.S. Cl. ................................... 126/400; 126/436; 165/45; 62/260
[58] Field of Search ...................... 126/400, 430, 436; 165/45, 142; 137/561 A; 62/260; 405/154, 131; 237/1 R

[56] References Cited

U.S. PATENT DOCUMENTS

| | | | |
|---|---|---|---|
| 231,058 | 8/1880 | Latham et al. ......................... | 62/260 |
| 1,875,305 | 8/1932 | Hill ..................................... | 165/45 |
| 3,742,983 | 7/1973 | Harter ............................ | 137/625.47 |
| 4,139,321 | 2/1979 | Werner ................................ | 126/400 |
| 4,205,718 | 6/1980 | Balch .................................. | 126/400 |
| 4,277,946 | 7/1981 | Bottum ................................ | 165/45 |
| 4,286,651 | 9/1981 | Steiger et al. ........................ | 164/45 |
| 4,361,135 | 11/1982 | Metz ................................... | 126/400 |
| 4,375,806 | 3/1983 | Nishman .............................. | 126/400 |

FOREIGN PATENT DOCUMENTS

| | | | |
|---|---|---|---|
| 379499 | 4/1922 | Fed. Rep. of Germany ........ | 62/260 |
| 3004062 | 8/1981 | Fed. Rep. of Germany ...... | 126/430 |
| 2058334 | 4/1981 | United Kingdom ................. | 165/45 |

*Primary Examiner*—Samuel Scott
*Assistant Examiner*—Noah Kamen
*Attorney, Agent, or Firm*—Sughrue, Mion, Zinn, Macpeak and Seas

[57] ABSTRACT

A borehole reservoir includes a plurality of vertical boreholes (5, 6) in each of which there is arranged pipes (9, 17) for feeding water to and returning water from the boreholes.

In order to avoid sealing the boreholes (5, 6) so as to prevent leakage when the water-circulating circuit is placed under pressure, all connections between the boreholes have, in accordance with the invention, been placed at a level beneath the ground-water level (2). This is achieved by providing spoke-like, horizontal boreholes (3, 4) from the central shaft (1), these boreholes intersecting the vertical boreholes (5, 6) located along the spokes and serving as supply and return lines for the water to and from the vertical boreholes. Since the pressure of the water within the boreholes is the same as that of the water externally of the boreholes, there will be no leakage from the boreholes (5, 6).

6 Claims, 5 Drawing Figures

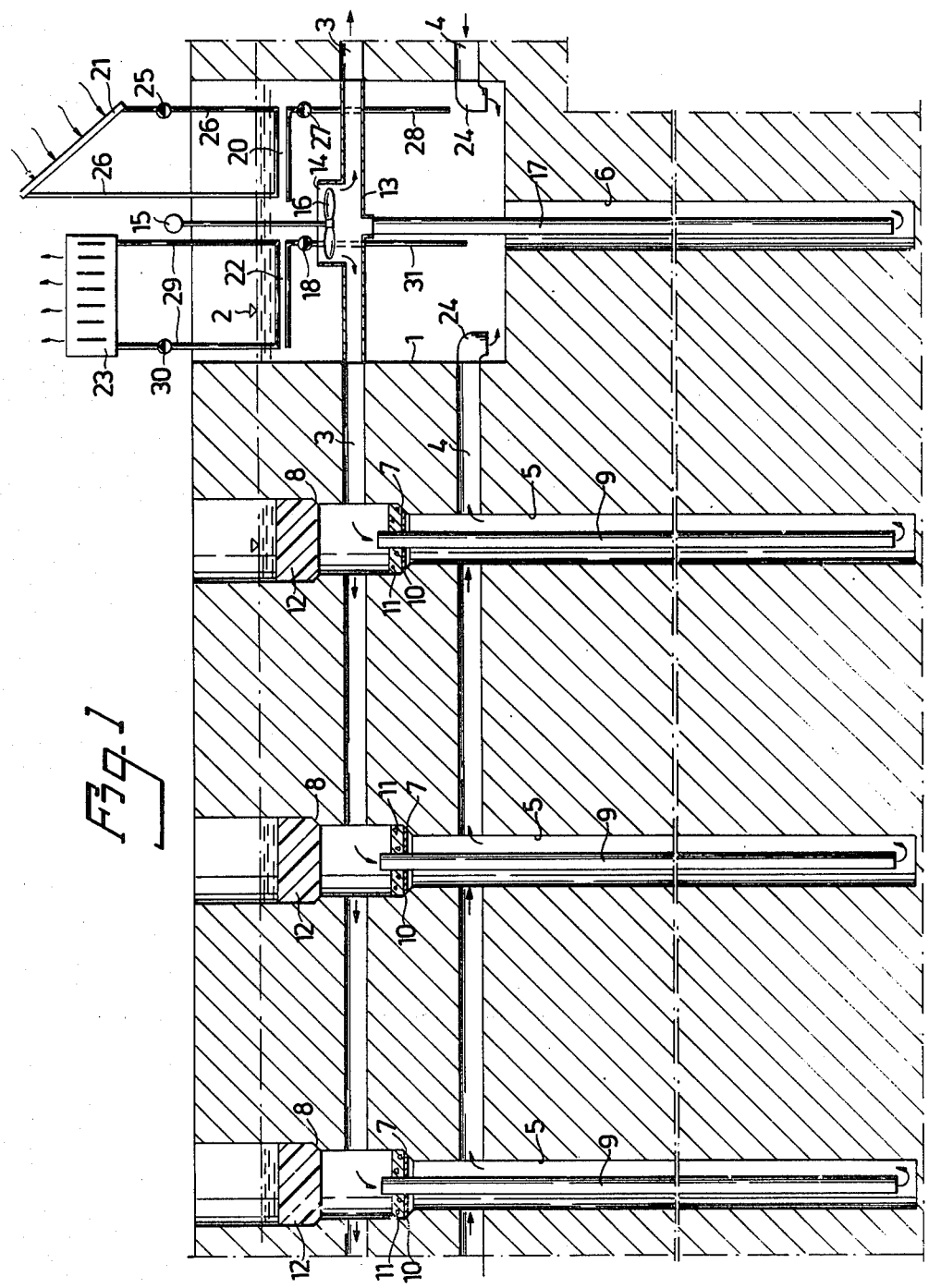

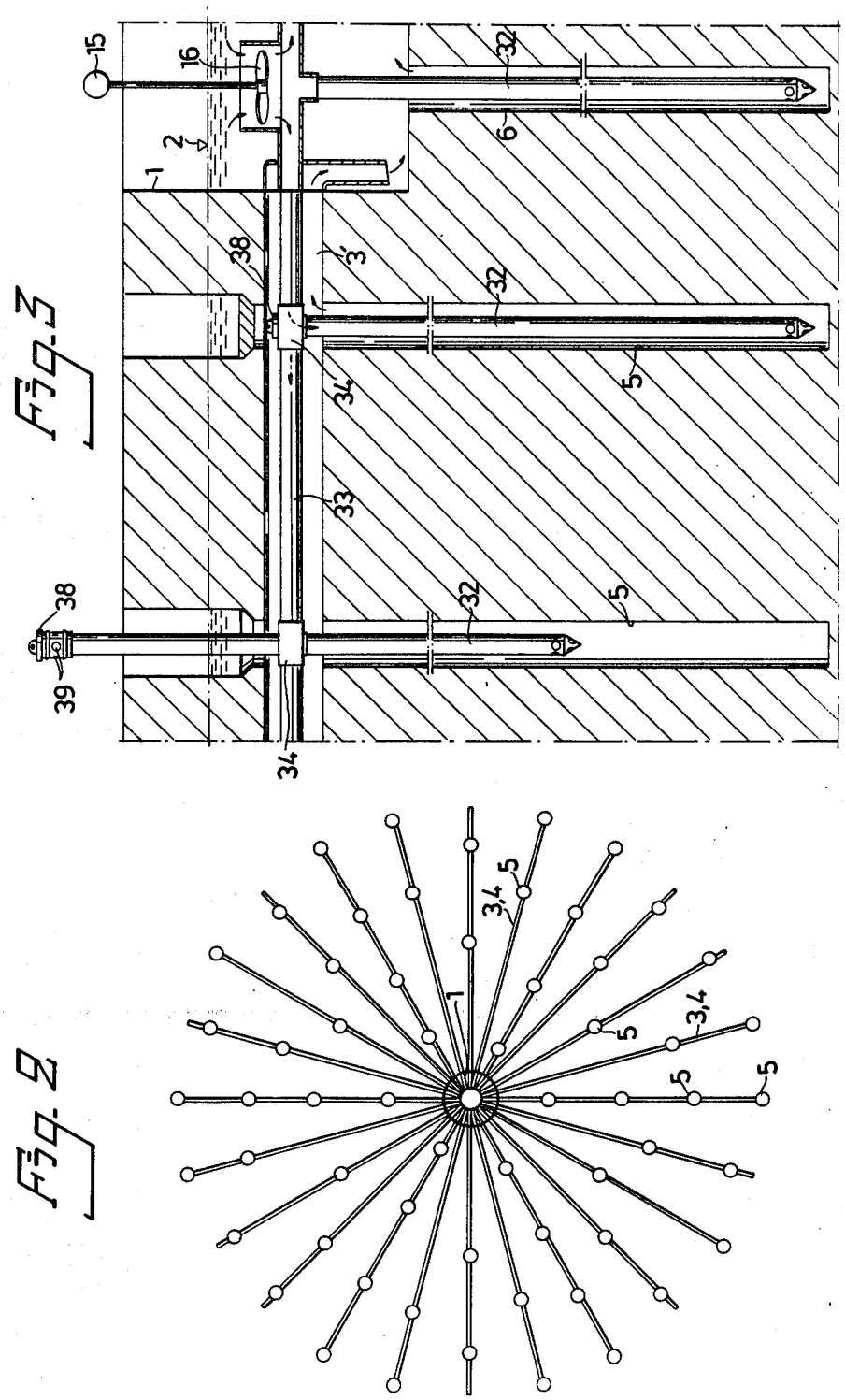

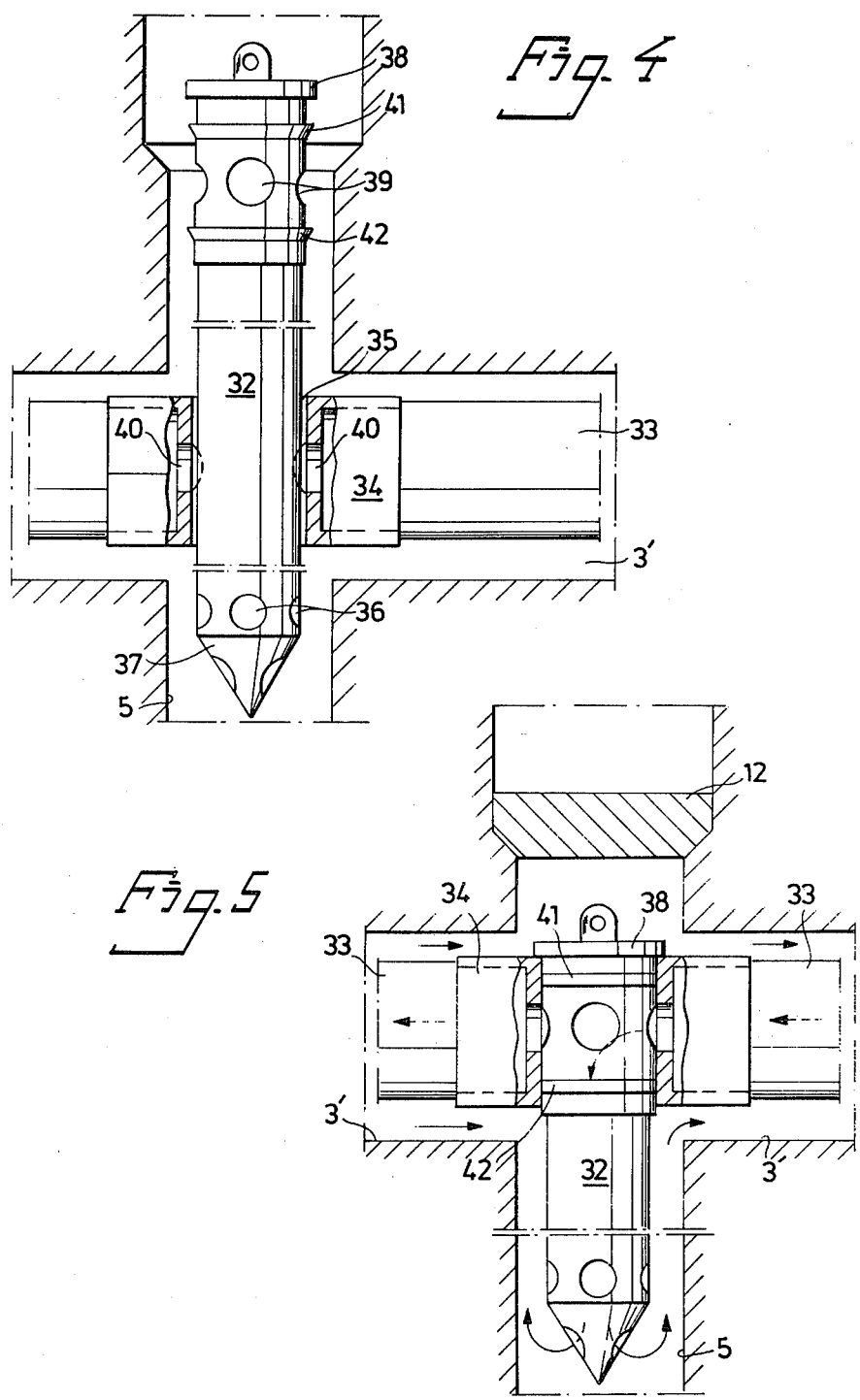

BOREHOLE RESERVOIR

BACKGROUND OF THE INVENTION

1. Field of the Invention

The present invention relates to a borehole reservoir. More specifically it relates to a borehole reservoir for the storage, and particularly for the seasonal storage, of heat in rock or similarly dense ground, including a plurality of substantially vertical boreholes. Each borehole has a centrally located pipe which is open at the bottom thereof and which extends to the vicinity of the bottom of respective boreholes. The upper parts of the boreholes and pipes are in communication with water-supply lines and water-return lines. A pump circulates the water through the lines and the pipes and an annular passage is located between said centrally located pipes and the walls of said boreholes. The lines are connected to heat-producing devices and heat-consuming devices for alternate supply and removal of heat to and from the water circulating in the reservoir.

2. Description of the Prior Art

In borehole reservoirs of this kind the upper ends of the pipes and the boreholes are connected to collecting mains arranged on the surface of the ground, these mains being, in turn, connected to at least two heat-exchange devices and a circulation pump. The circulation circuit is connected, through one of the heat-exchangers, to a heat-producing device, such as a solar-energy collector, and, via the other heat-exchanger, also to a heat-consuming device, such as a radiator.

Heat is transferred to the ground (the rock), by circulating hot water from the heat-producing device over the borehole reservoir, and is taken back by circulating colder water over the heat-consuming device and the borehole reservoir.

In order to prevent the ingress of air, the water in the collecting mains must have at least atmospheric pressure. Thus, the pressure in the collecting mains must be higher than the pressure of the ground water. Consequently, the boreholes must be provided with water-tight linings, to prevent water in the circulation circuit from leaking out through those cracks which are ever present in the ground, even in rock which appears to be totally crack-free. This greatly increases the cost of the borehole reservoir, and when the lining is made from a plastics material it also impairs the heat-transfer effect between the water in the boreholes and the surrounding wall material, which impairment must be compensated for by increasing the number of boreholes for a given heat-transfer effect.

The object of the present invention is to provide a borehole reservoir which comprises unlined boreholes, but which nevertheless is substantially free from leakages. This object is achieved in accordance with the invention, by arranging for the boreholes to intersect a plurality of substantially horizontal boreholes, which extend radially in spoke-like fashion from a central shaft, and which are located beneath the ground-water level, the vertical boreholes and the upper parts of the pipes communicating with the central shaft and with the water-circulating means through said horizontal boreholes. In this way, the water pressure in the boreholes and pipelines will be the same as the pressure in the externally located ground water.

The horizontal boreholes can be arranged in pairs at two levels beneath the ground-water level or half as many can be arranged at one single level. In this latter case, a pipeline is laid in each horizontal borehole, to provide a feedline and a return line in each horizontal borehole. One such horizontal pipeline is suitably provided with a separate T-pipe connector at each vertical borehole to enable the vertical pipes to be readily connected to the horizontal pipelines.

Because the borehole reservoir according to the invention must include a centrally located, water-filled shaft, the shaft is suitably dimensioned to enable it to be used as a short-term accumulator. Measures are suitably taken to maintain to the greatest possible extent and in a manner known per se temperature zoning in the water in the shaft.

BRIEF DESCRIPTION OF THE DRAWINGS

The invention will now be described in more detail with reference to a number of embodiments of arrangements according to the invention with reference to the accompanying drawings, in which FIG. 1 is a longitudinal sectional view of a first embodiment of the borehole reservoir, FIG. 2 is a plan view of said reservoir, FIG. 3 is a longitudinal sectional view of a second embodiment of the borehole reservoir according to the invention, FIG. 4 is a part sectional view illustrating the insertion of one of the vertical pipes through a T-pipe connector in FIG. 3, and FIG. 5 is a part sectional view, illustrating the downwardly inserted vertical pipe connected to the T-pipe connector in FIG. 3.

DETAILED DESCRIPTION OF THE PREFERRED EMBODIMENTS

In the embodiment illustrated in FIGS. 1 and 2, a central shaft 1 having a diameter of, for example, about 3 meters has been sunk, using the full-face boring technique, from the surface of the ground down to a level some meters beneath the ground-water level, indicated in FIG. 1 by a triangle 2. A plurality of spoke-like boreholes 3, 4 having a diameter of about 50 mm have been drilled from the shaft 1 at two levels, both of which are located beneath the ground-water level. The boreholes 3, 4 at the two levels are located in pairs in the same vertical plane, so that the vertical borehole 5, having a diameter of 100–200 mm from the ground surface in the vertical plane intersects the pairs of horizontal boreholes 3, 4. A corresponding vertical borehole 6 is also arranged at the bottom of the shaft 1.

Between the levels of respective boreholes 3 and 4, the boreholes 5 are widened in a step 7, and are again widened immediately above the level of the upper horizontal boreholes 3 in a further step 8. A vertical pipe 9 is suspended in each of the boreholes 5, by means of a flange 10 which is arranged at the upper end of the pipe and which sealingly abuts the step 7 and is firmly bonded to the wall of the widened borehole by means of cement 11. Pressed against each of the steps 8 is a plug 12 of elastic, insulating material. The inner ends of all of the upper horizontal boreholes 3 are connected, by means of a star-shaped connector 13, with an upwardly directed central opening 14, in which a pump impeller 16 driven by an electric motor 15 is arranged, and a downwardly directed opening, in which a vertical pipe 17 corresponding to pipes 9 is firmly fixed in the borehole 6.

The boreholes 5, 6 are intended to form a borehole reservoir for seasonal storage, and hence the boreholes 5, 6 have the distribution indicated in FIG. 2, with an optimal distance between the boreholes 5, 6 reaching to about 6.5 m in the case of granite, to about 5.5 m in the case of hard moraine. These distances may be smaller, although this would require the provision of an unnecessary number of boreholes and would increase the establishment costs of the reservoir. On the other hand, in order to save costs the distances can possibly be made greater in the centre of the reservoir, around the central shaft 1, without greatly impairing the reservoir.

The shaft 1 and the boreholes 3, 4, 5, 6 are filled with water, the pressure of which is balanced against the pressure of the surrounding ground water, and hence the water level in the shaft 1 and in the vertical boreholes 5 will coincide with the ground-water level. Consequently, there will be no appreciable leakage of water from and into the boreholes 3,4,5,6 and the shaft 1 respectively.

Heat is supplied to the water in the shaft 1 by the arrangement in said water of a heat-exchanger 20 connected to a solar-energy collector 21. Other heat-producing devices may also be connected to a corresponding heat-exchanger, such as a device for supplying waste heat, for example.

Heat is carried away from the water in the shaft 1 through a further heat-exchanger 22 arranged in the water, and connected to a radiator 23 or to some other heat-consuming device.

The hottest water in the shaft 1 is collected at the top thereof, from where the hot water is pumped by the pump 16 out into the horizontal boreholes 3, down through pipes 9, via constrictions (not shown) in the pipes 9 located nearest the shaft, for uniform distribution of the flows in the pipes 9, up through the annular spaces between the pipes 9 and the walls of the boreholes 5, and through the horizontal boreholes 4 back to the shaft 1, whereupon the cool return water is guided down towards the bottom of the shaft by baffles 24 located at the exit orifices of the boreholes 4 in the shaft 1, in order not to disturb the temperature stratification in the water.

A pump 25 forces a liquid in a closed circuit 26 through the solar-energy collector 21 and the heat-exchanger 20. A further pump 27 forces bottom water through a line 28 up to a counter-flow heat-exchanger 20.

The heat-exchanger 22 and the radiator 23 are connected to a closed circuit 29, in which water is circulated by means of a pump 30. Warm surface water in the shaft 1 is passed in counter-flow through the heat-exchanger 22, where it is cooled, and then down to the bottom part of the shaft, by means of a pipe 31 and a pump 18.

A corresponding operational mode can also be obtained with the embodiment illustrated in FIGS. 3–5, in which the need for horizontal boreholes at the lower level has been eliminated. This has been made possible by the fact that the water from the shaft 1 is fed to the various vertical pipes 32 in the vertical boreholes 5 through a pipeline 33 which is laid in the horizontal boreholes 3'. This requires the pipeline 33 to be coupled to the pipes 32 in a simple and reliable manner. This coupling of pipeline 33 and pipes 32 can be achieved in many different ways. One particularly practical way of achieving such a coupling is to arrange a T-pipe connector 35 on the pipeline 33 at each vertical borehole, and by providing said T-pipe connector with a through-passing, vertical passage 35 (FIG. 4) for the vertical pipe 32, which pipe has a pointed lower end 37 provided with a plurality of holes 36, and which is provided at its upper end with a closure means 38 having lateral openings 39 intended for communication with lateral holes 40 in the walls of the passage 35 when the closure means is inserted correctly in the passage 35, whereupon two annular seals 41, 42 on the closure means 38 come into sealing contact with the walls of the passage 35 above and beneath the openings 40. In this way, the vertical pipes 32 are sealingly connected with the interior of the horizontal pipeline 33.

FIG. 4 illustrates the pipe 32 inserted downwardly in a borehole 5, through the passage 35 in a T-pipe connector, and FIG. 5 shows the pipe 32 in its downwardly inserted position, with the closure means 38 located in its correct position, with the side holes 39 of said coupling communicating with the side holes 40 of the T-pipe connector. The through-flow areas from the pipeline 33 to the pipes 32 must, also in this case, be so adapted as to obtain substantially the same flow through all pipes 32.

I claim:

1. A borehole reservoir for the storage, and particularly for the seasonal storage, of heat in rock or similarly dense ground, including a plurality of substantially vertical boreholes (5, 6) each having a centrally located pipe (9, 17, 32) of less diameter than the surrounding borehole which pipe is open at the bottom thereof and which extends to the vicinity of the bottom of respective boreholes, the upper parts of the boreholes and pipes being in communication with water-supply lines and water-return lines, said lines in turn being connected to a device (16) for circulating the water through the lines and the pipes and annular passages located between said centrally located pipes and walls of said boreholes, and further including pipelines which are connected to heat-producing devices (21) and heat-consuming devices (23) for alternate supply and removal of heat to and from respectively the water circulating in the reservoir, characterized in that the vertical boreholes (5, 6) are unlined and arranged to intersect a plurality of substantially horizontal boreholes (3, 4, 3') which extend outwardly in a spoke-like manner from a centrally located shaft containing water up to a ground-water level and which are located beneath the ground-water level and serve as said water-supply and water-return lines, and through which the upper parts of said vertical boreholes (5, 6) and said centrally located pipes (9, 17, 32) communicate with the central shaft (1) and the device (16) for circulating the water.

2. A borehole reservoir according to claim 1, characterized in that the substantially horizontal boreholes (3, 4) are arranged in pairs at two levels beneath the ground-water level, the upper ends of the pipes (9) located in the vertical boreholes (5) being connected with the substantially horizontal boreholes (3) at the upper level, while the annular passages are connected to the substantially horizontal boreholes (4) at the lower level.

3. A borehole reservoir according to claim 1, characterized in that each of the substantially horizontal boreholes (3') include a pipeline (33) and an annular passage between the pipeline and the borehole, said pipeline having at each vertical borehole (5) a T-pipe connector (34) which connects the pipeline (33) with the pipes (32) of the vertical boreholes (5) located along said pipeline, the annular passages in the vertical boreholes (5) communicating with the annular passages around the pipeline (33) in the substantially horizontal boreholes (3').

4. A borehole reservoir according to claim 3, characterized in that the T-pipe connector (34) has a vertical, throughpassing passage (35), in which a coupling piece (38), having side openings (39), and being firmly mounted on the upper end of respective pipes is inserted from above into sealing abutment with the T-pipe connector (34) while simultaneously connecting the interiors of respective pipes (32) with the interior of the pipeline (33) via the side openings (39, 40).

5. A borehole reservoir according to claim 1, characterized in that the central shaft (1) containing water up to the ground-water level is dimensioned to serve as a heat accumulator.

6. A borehole reservoir according to claim 1, characterized in that the heat-producing devices (21) and the heat-consuming devices (23) are in thermal connection with the water circulating in the reservoir through heat-exchangers (20, 22) arranged in the water in the central shaft (1).

* * * * *